UNITED STATES PATENT OFFICE.

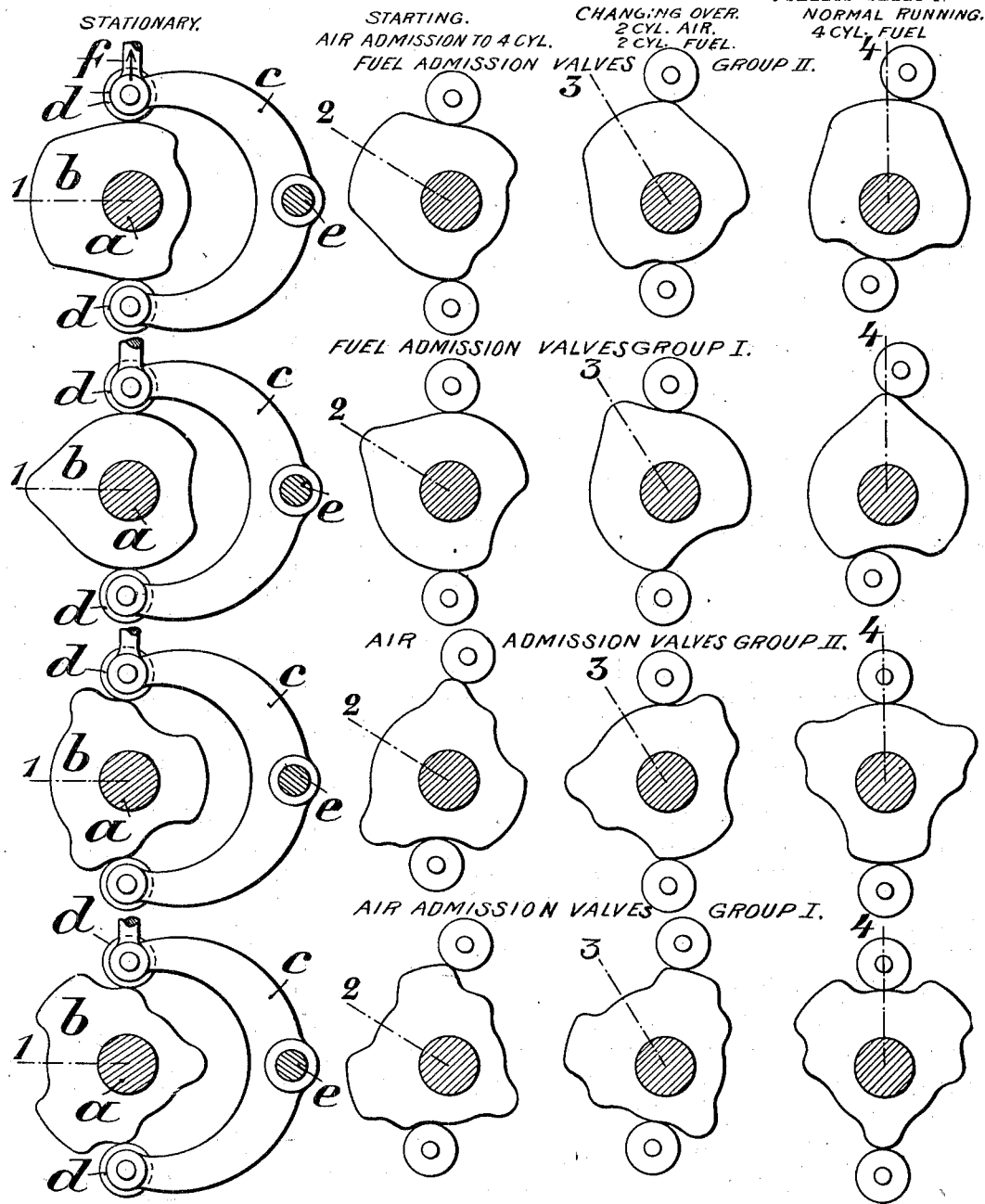

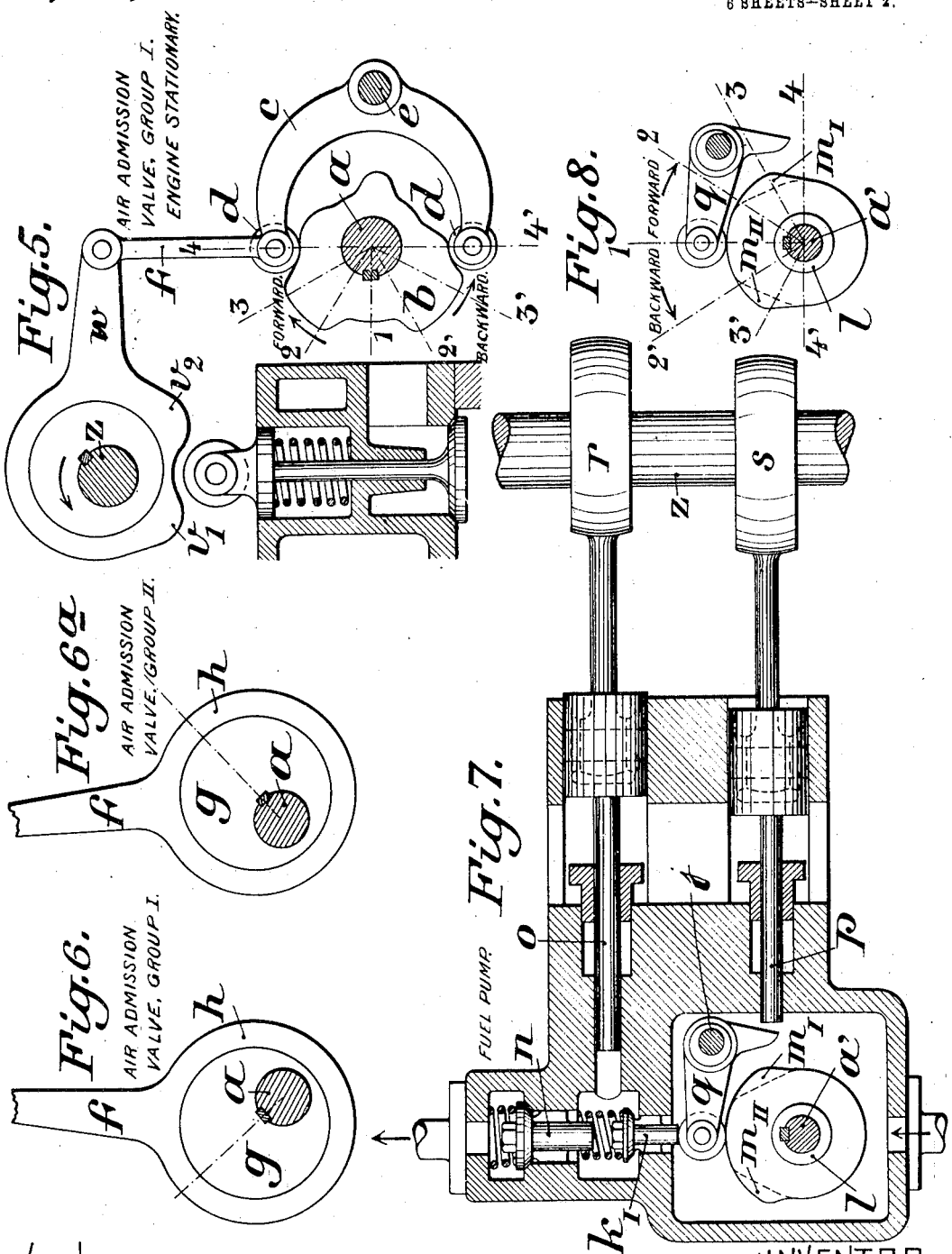

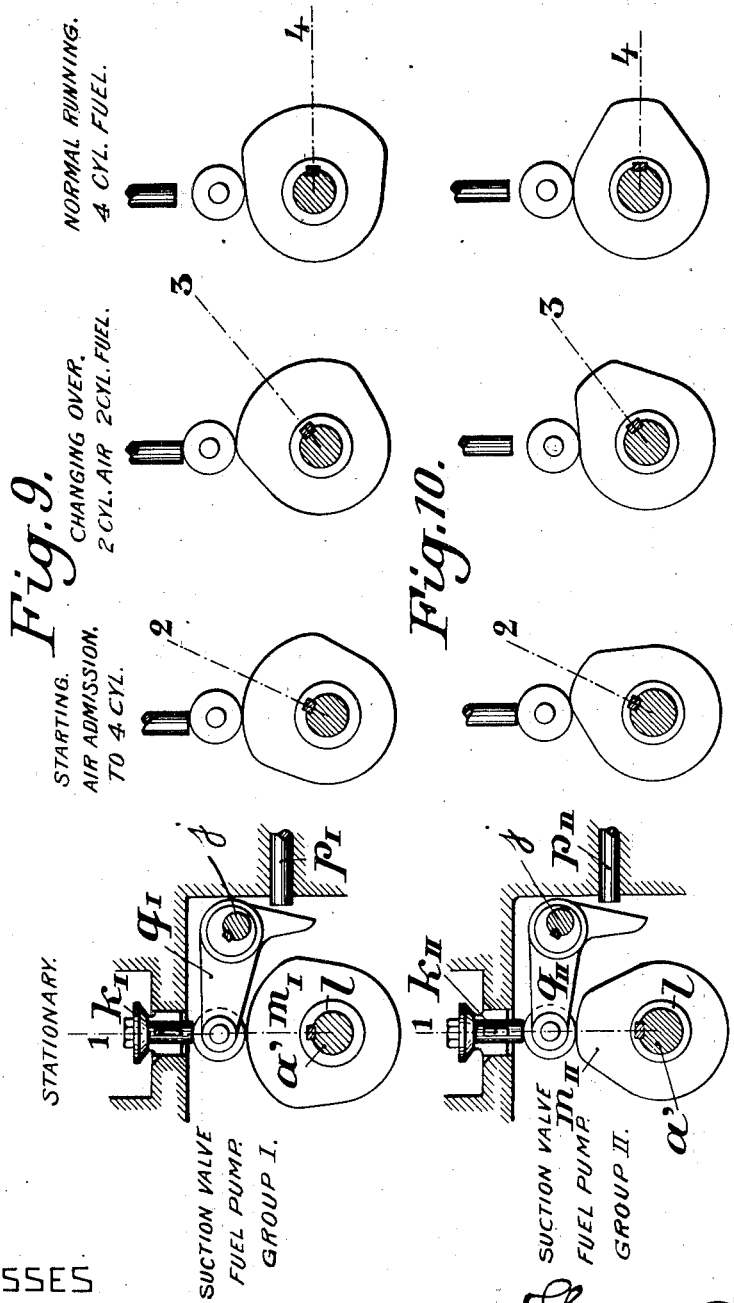

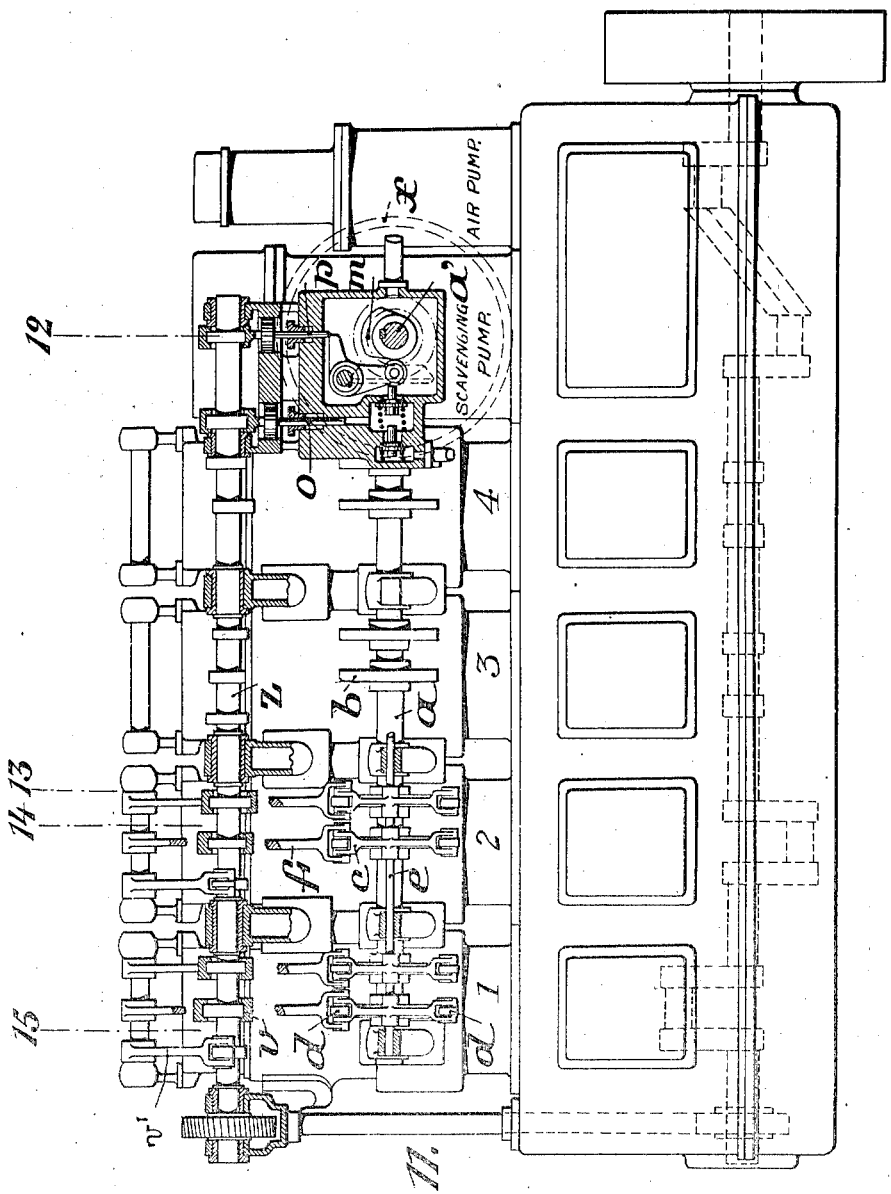

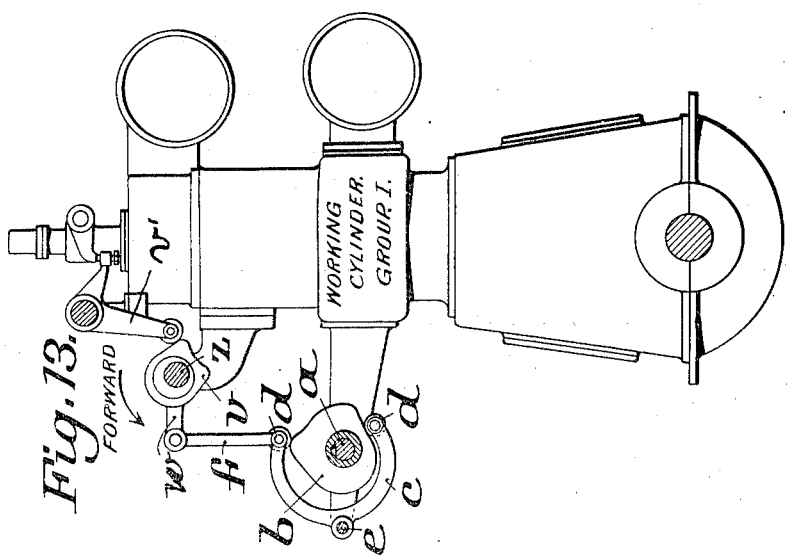
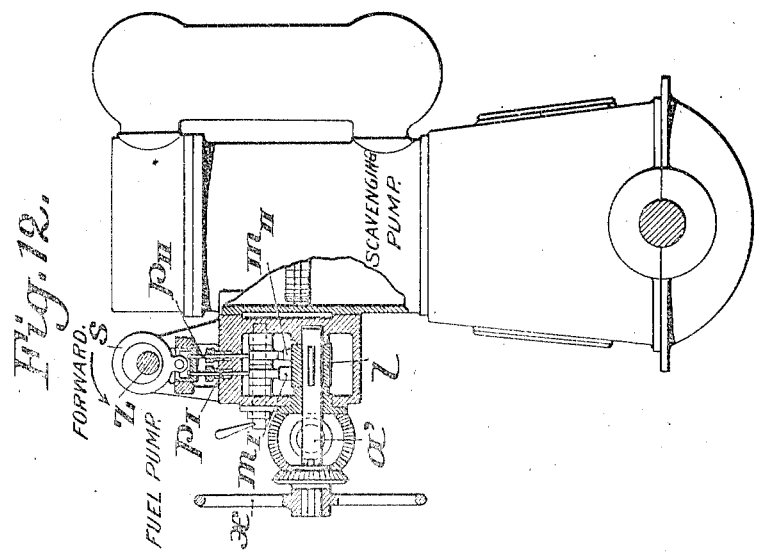

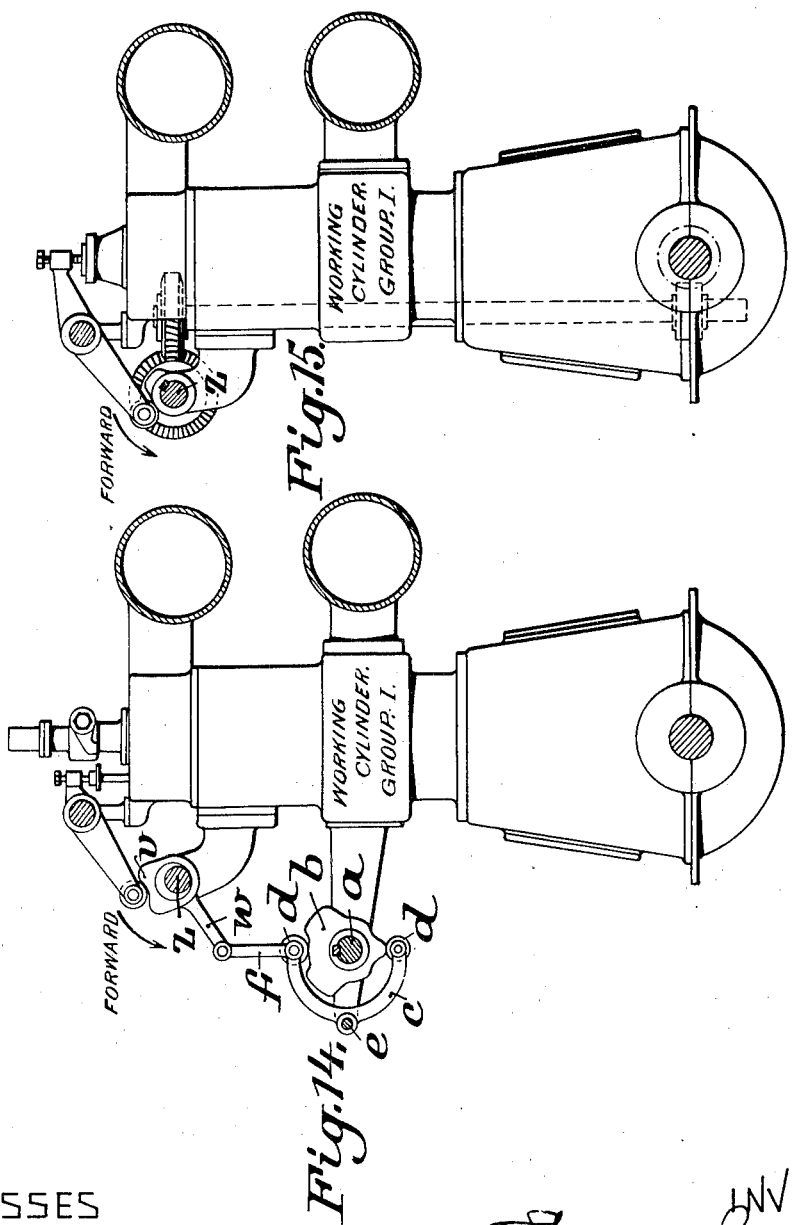

THEODOR REUTER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION ENGINE.

1,112,837.      Specification of Letters Patent.      Patented Oct. 6, 1914.

Application filed August 13, 1909. Serial No. 512,695. Renewed April 8, 1913. Serial No. 759,819.

*To all whom it may concern:*

Be it known that I, THEODOR REUTER, engineer, a citizen of the Swiss Republic, residing at 24 Obere Wielandstrasse, Winterthur, Switzerland, have invented certain new and useful Improvements in Internal-Combustion Engines, and I do hereby declare the following to be a full, clear, and exact description of the invention, such as will enable others skilled in the art to which it appertains to make and use the same.

This invention relates to multi-cylinder reversible internal combustion engines which are started forward or backward by supplying all the cylinders with compressed air or gas and then subsequently changing the working of the several cylinders in groups or singly to that of internal combustion, which change is effected by adjusting the position of the engine starting and reversing device.

According to this invention the pump or pumps supplying the fuel to the cylinders are operated during the whole time the engine is working, both under compressed air and under internal combustion, but each pump has a device, controlled from the reversing device, which is operated to interrupt the fuel feed to the cylinder or cylinders when the engine at starting is working under compressed air, but resumes the feed to the cylinders severally or in groups when the reversing lever is turned to the position for normal running in part or all of the cylinders as the case may be.

The changing over of the engine from one kind of running to the other is effected by the joint control of the cylinder valves and the suction valves of the fuel pumps.

The engine has a reversing shaft with cam guides or cam disks, which are caused to act through an intermediate link on the distributing cams or the like of the starting air valves and fuel admission valves in such a manner that these are operated in succession in a certain order. When the engine has been stopped all the cams which act upon the air starting valves and fuel-inlet valves are in inoperative position and the fuel pumps are also in inoperative condition. When the engine is to be started, the reversing shaft is rotated a certain amount whereby all the starting valves for the admission of compressed air are set in operation and when the engine has commenced to run then by a further rotation of the reversing shaft, (owing to the action of the guide cams on the intermediate members between the reversing shaft and the distributing cams) the starting valve of one or more of the cylinders is put out of operation and the corresponding fuel admission valve or valves are put into operation. At the same time, owing to the re-removal of the cams from the suction valves the fuel pumps start feeding the cylinder or cylinders which are now to operate with internal combustion. On the further rotation of the reversing shaft the working of the remaining cylinder or cylinders which up to now have been running on compressed air, is changed to that of internal combustion either all at once or in succession or in groups as the case may be. The steps are the same whether the engine is running forward or reversing.

In the accompanying drawings, Figures 1-4 are diagrams showing various positions of the cam guides for different phases of working, from the engine being at rest to the normal running of the engine under internal combustion; Fig. 5 is a section through a valve casing and the reversing shaft; Figs. 6 and 6ª show a modified arrangement in lieu of the cam disks on the reversing shaft; Fig. 7 is a section of a fuel pump and fuel control devices; Fig. 8 is a cam and lever of the device shown in Fig. 7; Figs. 9 and 10 show various positions of the cams controlling the supply of fuel by the pump, and Figs. 11-15 show an internal combustion engine with this invention applied.

In the drawings, $a$ is the reversing shaft, and $b$ the cam disks rotating therewith. The cam disks $b$ are engaged by the forks $c$ loosely journaled on the shaft $e$. The rotation of the cam disks $b$ is transmitted by the rollers $d$ to the fork $c$ and thence to the rods $f$ and the eccentric member $w$ with its cams $v_1$ and $v_2$. For forward motion the shaft $a$ is rotated so that the lever $f$ rises and if the cam shaft $z$ be considered at rest the eccentric $w$ is so rotated that its cam $v_1$ takes up a position above the valve with which it coöperates. If now the operating shaft $z$ is rotated the eccentric $w$ executes an up and down oscillatory movement and so the valve is operated by the cam $v_1$. When the engine is to be reversed the reversing shaft $a$ is rotated in the opposite direction so that the rod $f$ is moved downward and the valve is operated by a cam $v_2$. Each fuel admission valve and starting valve is operated in this manner and each has a corresponding mechanism $b\ c\ d\ e\ f\ w$.

The operation of the reversing shaft and the shape of the cam disks is seen from Figs. 1–4, the cams being shown in various positions, from that which they have when the engine is at rest to that which they have when the engine is running normally under internal combustion. It is assumed that the engine has four cylinders and that these cylinders operate in two groups, I and II, that on starting all the cylinders work with compressed air, then group II works under internal combustion and finally all the cylinders work under internal combustion.

In Figs. 1 to 4, in the uppermost horizontal line the positions numbered 1—4 show the positions of the cams for the fuel admission valves of group II, the second line or row the same for group I, the third row the cams for the starting valves of group II and the fourth row the same for group I.

In the position shown in Fig. 1, which is the position when the engine is at rest, all the cams $b$, forks $c$ and rods $f$ are in the mid-position, so that all the corresponding members $w$, Fig. 5, for operating the fuel admission and starting valves, are out of action. In the position for starting all the cylinders by compressed air, Fig. 2, all the starting valve operating devices or members are set in action, but the cam disks $b$ of the fuel admission valves have not however yet raised their guide rollers $d$, so that all the fuel admission valve operating devices are still out of action. In the position for starting with half of the cylinders operating with internal combustion (Fig. 3) the starting valves of the group II are out of action and the fuel admission valves of the group II are set in operation. In the position for normal running (Fig. 4) all the fuel admission valves are in operation and all the starting valves out of action.

The cam disks $b$ may be replaced by a solid disk having a cam groove in which the roller $d$ runs or the cam path may be raised from the surface of the disk. Also instead of being on a circular disk they can be in development on an oscillating system, the oscillating movement of the reversing shaft $a$ then becoming an oscillatory longitudinal motion. Also instead of the guide fork $c$ an ordinary eccentric keyed on the reversing shaft $a$ may be used. This is shown in Figs. 6 and 6ª where the rotation of the eccentric $g$ rigidly fixed to the shaft $a$ results in a corresponding adjustment of the rod $f$ and the eccentric ring $h$. The two eccentrics for operating the starting valves of the two groups of cylinders are shown in their positions when the engine is at rest. The transmission to the cam disks $w$ is the same as already explained with reference to Fig. 5.

The actuation of the fuel supply pumps is shown diagrammatically in Figs. 7 to 10. For operating the fuel supply pumps the same assumption is made as for the valves, namely the division of the four working cylinders into two groups I and II of which group II is set to normal running before group I.

The fuel supply pump has several supply pistons corresponding to the number of groups of cylinders—in the present case two—in separate supply chambers and for each piston there is a suction and pressure valve. A device shown in the drawings comprising an eccentrically journaled lever $j$ effects in the usual manner the regulation of the supply through the pump between zero and a maximum. Apart from this regulation, according to the present invention, the supply of fuel is interrupted when the engine is to be stopped and when working with compressed air, by the suction valve remaining open during the whole of the compression stroke of the feed piston so that the fuel compressed by the piston flows back through the suction valve.

In the construction shown in Figs. 7 to 10, and adapted for this purpose, on the reversing shaft or on an auxiliary shaft $a'$ connected therewith is fixed the cam disk $l$ with the two regulating cams $m_I$ and $m_{II}$ one behind the other, which, in the position shown when the engine is at rest, raises both the suction valves $k_I$ and $k_{II}$ of the group and so cut off the supply of fuel. $n$ is the compression valve, $o$ the supply piston and $p$ a rod which operates the suction valve through the intermediate member $q$ during normal running and so controls the supply of fuel to all the cylinders, as long as the suction valves are not continuously raised by the cams $m_I\ m_{II}$.

$r$ and $s$ are two eccentrics on the shaft $z$ operating the piston and rods $o$ and $p$.

Figs. 9 and 10 show successive positions 1—4 of the cam disks 1 in the fuel pumps, from a position of rest to running forward on internal combustion. The upper line, (Fig. 9) refers to the fuel pumps in group I, the lower column (Fig. 10) to the fuel pumps in group II. If therefore during the starting the starting valves of group II are cut out and the working of these cylinders changed to running with internal combustion, then, by rotating the shaft $a'$ with the cam disks $l$, the cam $m_{II}$ is removed from the suction valve $k_{II}$ and the fuel supply starts for the group II in amount dependent on the position of the lever $q_{\text{II}}$. By further rotating the shaft $a'$, the fuel supply valves are put into operation for the group I, and the suction valves of the corresponding supply pumps are released. The characteristic feature of the invention is therefore that on the one hand the starting or air valves are put out of operation one by one or in groups by the reversing shaft, at the same time the corresponding fuel admission valves are put into operation, while on the other hand the fuel supply is forcibly cut off by the reversing shaft when the cylinders are working with compressed air.

In Figs. 11–15 the combined working of the fuel pumps and valve operating devices is shown in one construction. The reference letters are the same as in Figs. 1–8. Fig. 11 shows in elevation a four cylinder internal combustion engine with scavenging and compressed air pumps, the regulating mechanism being partly in section. Fig. 12 shows the fuel supply pump regulation, being a section through the auxiliary piston $p$ in Fig. 11. Fig. 13 shows in elevation the operation of the fuel admission valves. Fig. 14 shows the operation of the compressed air valves. Fig. 15 shows the operation of the scavenging air valves.

The construction shown is an ordinary reversible two stroke engine which operates on the Diesel system. The regulation is effected by rotating the hand wheel $x$ into the position corresponding to the kind of running intended. Through the hand wheel the movement is transmitted to the auxiliary reversing shaft $a'$ and the regulation of the fuel pumps is effected by means of the cam disks $l$ and their cams $m_{\text{I}}$, $m_{\text{II}}$, in the manner shown more fully in Figs. 9 and 10. The normal fuel supply then begins as soon as the cams $m_{\text{I}}$ $m_{\text{II}}$ have moved from under the rollers of the lever $q$. At the same time the operation of the cam disks $b$ controlling the valves of the engine cylinders is effected by the rotation of the main reversing shaft $a$ by shaft $a'$ by means of bevel gearing, as shown in Fig. 12.

In Fig. 11 the two cylinder groups I and II are shown by two working cylinders each. The fuel injection and compressed air valves are differently regulated for all four cylinders, the scavenging valve however is operated in a constant manner for all cases. The fuel injection valve, compressed air valve and fuel pump valve are operated by the eccentrics of the shaft $z$ for each stroke, the operation of the fuel and compressed air valves is dependent on the position of the cam disks $b$ also the operation of the suction valve of the fuel pump is dependent on the position of cam disk $l$. In all cases the cam disks $b$ and $l$ operate together in such a manner that the cutting out of the fuel supply by the pumps and the cutting out of fuel supply valve operation is effected simultaneously in the separate groups.

The position of the reversing shafts $a$ or $a'$ are the same for Figs. 12–15 and show the normal working of the four working cylinders with fuel for forward running of the engine. The motion of the eccentric cams $v$ is transmitted to the main valve by two armed rocking levers $v'$ fitted with rollers, as seen in Fig. 13.

What I claim is:—

1. In change-over mechanism for internal combustion engines having a plurality of cylinders, the combination with an air admission valve and an air starting valve for each of said cylinders, and a fuel-injection valve for each cylinder, of means for first setting all of the starting valves in action, and for then putting said valves out of action and bringing the fuel-injection valves into action in a predetermined sequence.

2. In change-over mechanism for multiple cylinder internal combustion engines, the combination with air admission and air starting valves for the respective cylinders, and fuel-injection valves for said cylinders, of means for first setting all of the starting air valves in action and then putting them out of action in a predetermined order at the same time that the corresponding fuel-injection valves are brought into action, and mechanism to operate said means in order to drive the engine forward or backward under the impetus of explosions in all the cylinders.

3. In a multiple cylinder internal combustion engine, air starting valves for the several cylinders, fuel valves also associated with the cylinders, rotary engine driven means and devices adapted to be actuated thereby to actuate the starting and fuel valves, in combination with a rotary starting and reversing mechanism including elements pertaining respectively to said engine driven devices and connections between said elements and said devices whereby the starting valves are first brought into action, and then put out of action in predetermined order, the fuel valves being correspondingly brought into action, and in proper time for running under combustion either forward or backward dependent upon the movement of the reversing mechanism.

4. In a multiple cylinder internal combustion engine, the combination with air starting valves for the several cylinders, fuel valves also associated therewith, a rotary engine driven shaft bearing eccentrics, and members actuated by the eccentrics and having double cam projections to actuate the starting and fuel valves of the several cylinders for forward and backward running, respectively, with an intermediate space enabling the valves to be put out of action, of a control device having elements connected with the double cam members of the starting valves and other elements connected with the double cam members of the fuel valves and so arranged that for running in either direction the several starting valves are first brought into action, after which the starting valves are put out of action in predetermined order at the same time that the fuel valves are correspondingly brought into action.

5. In change-over mechanism for multiple cylinder internal combustion engines, the combination with air starting valves associated with the respective cylinders, and fuel valves for said cylinders, of cam mechanism arranged to set all of the starting valves in action initially and to then put such valves out of action in a predetermined sequence and bring the corresponding fuel valves into action at the same time, and pumping means operative for supplying fuel to said fuel valves only as they are brought into action.

6. In change-over mechanism for multiple cylinder internal combustion engines, the combination with the starting valves and the fuel valves, of mechanism to set the starting valves initially in action, and to then put said valves out of action and bring the fuel valves into action, and fuel supply mechanism automatically controlled by said mechanism.

7. In change-over mechanism for multiple cylinder internal combustion engines, the combination with the starting valves and the fuel valves, of mechanism to set the starting valves initially in action, and to then put said valves out of action and bring the fuel valves into action, and fuel supply mechanism operated by the running of the engine but so controlled by said first named mechanism as to prevent the feed of fuel to the cylinders until their respective fuel valves are brought into action.

8. In change-over mechanism for multiple cylinder internal combustion engines, the combination with the air starting valves and the fuel valves, of cam mechanism to set all of the starting valves initially in action and to then put such valves out of action and bring the fuel valves into action, a fuel pump having suction valves, and means to so actuate said suction valves when the corresponding fuel valves are out of action as to cut off the supply of fuel from the respective cylinders.

9. A change-over mechanism for multiple cylinder internal combustion engines, comprising air starting valves for the several cylinders, fuel valves also associated with said cylinders, and fuel pumps for supplying the fuel valves, in combination with means operative to set the starting valves in action and thereafter put said starting valves out of action in predetermined order, at the same time bringing the fuel valves correspondingly into action, said means also controlling said fuel pumps so as to render the same operative in the same order as the corresponding fuel valves.

10. In a multiple cylinder internal combustion engine, air starting valves for the several cylinders, fuel valves also associated with said cylinders, engine operated devices for opening and closing the starting and fuel valves, and fuel pumps for supplying the fuel valves, in combination with a rotary control member bearing elements connected respectively with said engine-operated devices whereby the starting valves may first be brought into action, and then put out of action in predetermined order at the same time that the fuel valves are correspondingly brought into action, said control member also operating means for rendering said fuel pumps operative or inoperative in the same order as the fuel valves which they supply.

11. In a multiple cylinder internal combustion engine, air starting valves for the several cylinders, fuel valves also associated with said cylinders, engine operated devices for opening and closing the starting and fuel valves, and fuel pumps for supplying the fuel valves, in combination with a rotary reversing shaft bearing elements connected respectively with the engine-operated devices and adapted by movement in either direction from mid-position first to bring the starting valves into action, and then to put the starting valves out of action in predetermined order at the same time that the fuel valves are correspondingly brought into action, for running forward or backward as the case may be, and means co-ordinated with said reversing shaft for rendering said pumps operative and inoperative in the same order as the fuel valves which they supply.

12. In a multiple cylinder internal combustion engine, the combination with air starting valves for the several cylinders, fuel valves associated with the same cylinders, and fuel pumps for supplying the fuel valves, said fuel pumps having suction valves, of control mechanism adapted first to bring the several starting valves into action and then to put said valves out of action in predetermined order at the same time bringing the corresponding fuel valves into action, said control mechanism also including means acting upon the suction valves of the fuel pumps whereby the pumps are rendered operative or inoperative in the same order as the corresponding fuel valves.

13. In an internal combustion engine, the combination with air starting and fuel valves, a fuel pump for supplying the latter, and means for actuating the starting and fuel valves, of mechanism for controlling said actuating means so as to change over from air operation to combustion running and means acting upon the suction valve of the fuel pump to render the pump inoperative except when the corresponding fuel valve or valves are in action.

In testimony whereof I have affixed my signature, in presence of two witnesses.

THEODOR REUTER.

Witnesses:
 WILHELM BACHMANN,
 WALTHER REINHART.